US005818466A

United States Patent [19]

Ryu

[11] Patent Number: 5,818,466

[45] Date of Patent: Oct. 6, 1998

[54] APPARATUS FOR PROVIDING MULTI-LAYER SPRITE GRAPHIC FOR AN ON-SCREEN-GRAPHIC OF TELEVISION

[75] Inventor: Kyoung-Keol Ryu, Seoul, Rep. of Korea

[73] Assignee: Samsung Electronics Co., Ltd., Kyungki-do, Rep. of Korea

[21] Appl. No.: 808,215

[22] Filed: Feb. 28, 1997

[30] Foreign Application Priority Data

Feb. 28, 1996 [KR] Rep. of Korea ........................ 96-4984

[51] Int. Cl.$^{6}$ ........................................ G06F 12/06

[52] U.S. Cl. .......................... 345/516; 345/508; 348/586

[58] Field of Search ................................ 345/508, 516, 345/515, 507, 509; 348/578, 584, 586

[56] References Cited

U.S. PATENT DOCUMENTS 5,731,810 3/1998 Oda ........................................ 345/192

*Primary Examiner*—Kee M. Tung

*Attorney, Agent, or Firm*—Sughrue, Mion, Zinn, Macpeak & Seas, PLLC

[57] ABSTRACT

A method and apparatus for providing a multi-layer sprite graphic function in video equipment having an on-screen-graphic function where the multi-layer sprite graphic function is realized in hardware to accomplish a smooth graphic. The multi-layer sprite graphic apparatus includes a controller for generating scan address data, a frame memory for outputting video data stored therein according to the scan address data, a window pulse generator for receiving the scan address data and for generating a window pulse which represents scan address data which is included in a window area, an address generator for generating read address data according to the window pulse, a sprite memory for storing sprite graphic data and outputting the stored sprite graphic data according to the read address data, and a data selector for selecting and outputting one of the data output from the frame memory and the sprite memory according to the presence or absence of the data output from the sprite memory.

10 Claims, 3 Drawing Sheets

APPARATUS FOR PROVIDING MULTI-LAYER SPRITE GRAPHIC FOR AN ON-SCREEN-GRAPHIC OF TELEVISION

BACKGROUND OF THE INVENTION

The present invention relates to an on-screen-graphic apparatus for a television, and more particularly, to an apparatus for providing a multi-layer sprite graphic.

The performance of general television sets has been developed and improved over the years in response to consumer demand. As a result, it has come to be expected that television makers will compete to support a user interface. To support such a user interface, no remarkable progress has been made since the on-screen-display function was adapted in the television. However, motivated by recent developments in computer graphics, an on-screen-graphic technique for realizing a graphic on a television screen has been attempted.

A "sprite", which is one of the techniques for effectively performing an animation function using an on-screen-graphic technique of a television, separately stores object images and background images. As a result, when the stored images are displayed on a monitor screen, a background portion, which has been hidden by the object, cannot be displayed on the screen.

According to a conventional technique, a sprite buffer is allocated in software using a high speed CPU, and data with respect to objects stored in the sprite buffer is compared with data with respect to background images stored in a frame buffer, to thereby realize a sprite graphic function.

However, although a high speed CPU has been used, buffer allocation speed becomes so slow that it is difficult to provide a smooth sprite graphic function. Also, since the conventional sprite graphic technique has allocated only one sprite buffer, only a mono-layer sprite graphic function can be realized. Thus, when a plurality of sprite graphic images are realized, another technique such as a block copy should be used at a portion where sprite graphic images overlap.

SUMMARY OF THE INVENTION

To solve the above problem, it is an object of the present invention to provide an apparatus for providing a sprite graphic in hardware to represent an image of a fast moving object.

It is another object of the present invention to provide an apparatus for providing a multi-layer sprite graphic.

To accomplish the above objects of the present invention, there is provided an apparatus for providing a multi-layer sprite graphic function in video equipment having an on-screen-graphic function, the multi-layer sprite graphic apparatus comprising: a controller for generating scan address data; a frame memory for outputting video data stored therein according to the scan address data generated by the controller; a window pulse generator for receiving the scan address data generated by the controller and for generating a window pulse which represents scan address data which is included in a window area determined by external data, among the received scan address data; an address generator for generating read address data according to the window pulse supplied from the window pulse generator; a sprite memory for storing sprite graphic data and for outputting the stored sprite graphic data according to the read address data supplied from the address generator; and a data selector for selecting and outputting one of the data output from the frame memory and the sprite memory according to the presence or absence of the data output from the sprite memory.

BRIEF DESCRIPTION OF THE DRAWINGS

The preferred embodiments of the present invention are described with reference to the accompanying drawings wherein.

DETAILED DESCRIPTION OF THE PREFERRED EMBODIMENTS OF THE INVENTION

A preferred embodiment of the present invention will be described in detail with reference to the accompanying drawings.

Figure 1:
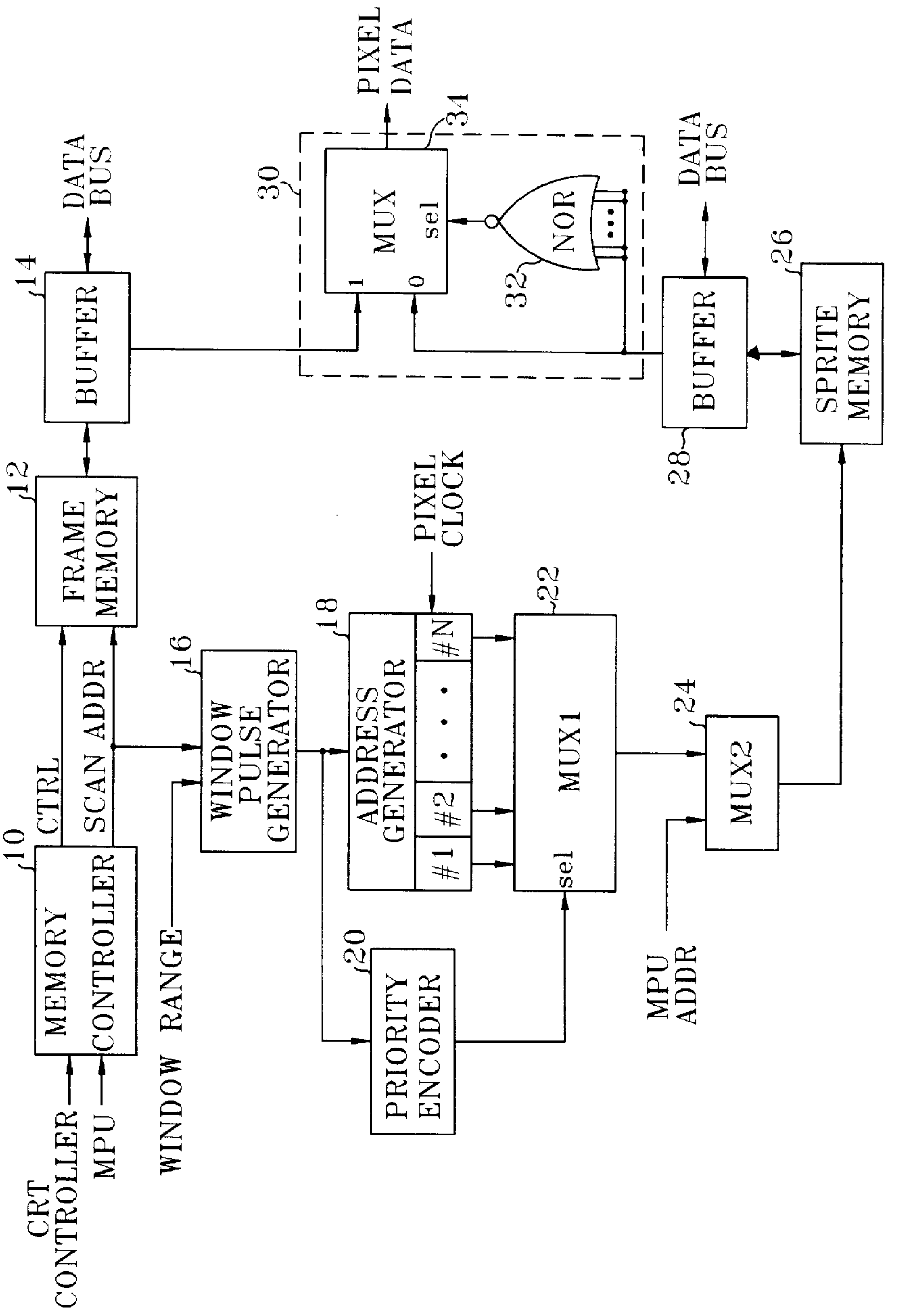
FIG. 1 is a block diagram showing an apparatus for providing a sprite graphic function according to a preferred embodiment of the present invention.

FIG. 1 shows an apparatus for providing a multi-layer sprite graphic function according to a preferred embodiment of the present invention. In FIG. 1, a memory controller 10 receives signals from a cathode ray tube (CRT) controller (not shown) and an MPU (not shown). The memory controller 10 uses the input signals and generates a control signal (CTRL) and a scan address (SCAN ADDR) for writing or reading data to or from a frame memory 12. The generated control signal and scan address are supplied to the frame memory 12. The frame memory 12 stores data input via a first buffer 14 according to the control signal and scan address supplied from the memory controller 10 and outputs the stored data to the first buffer 14. Meanwhile, the scan address generated in the memory controller 10 is further supplied to a window pulse generator 16.

The window pulse generator 16 compares the input scan address with an address of a window range supplied from an external source to generate a window pulse. The window pulse generator 16 outputs the window pulse to an address generator 18 and to a priority encoder 20. The address generator 18 generates an address of a sprite memory 26 corresponding to the input window pulse and supplies the generated addresses to signal input ends of a first multiplexer (MUX1) 22. The priority encoder 20 generates a priority value among a plurality of window pulses according to predetermined priority information when the plurality of the window pulses are input, and supplies the priority value to a select end (sel) of the first multiplexer 22. The first multiplexer 22 selects one of the input addresses according to the value input via the select end thereof and outputs the selected address to a second multiplexer 24. The second multiplexer 24 supplies a write address (MPU ADDR) supplied from the MPU (not shown) to the sprite memory 26. Also, the second multiplexer 24 supplies the address generated from the address generator 18 to the sprite memory 26 as a read address.

The data output from the frame memory 12 and the sprite memory 26 are respectively input to signal input ends (1,0) of a multiplexer 34 in a data selector 30 via the first and second buffers 14 and 28. Binary bit values constituting data output via the second buffer 28 are input to a NOR gate 32 in the data selector 30. The NOR gate 32 performs a NOR operation of the input values and supplies the NOR operation result to the select end (sel) of the multiplexer 34. The multiplexer 34 selects one of the input data according to the value input to the select end thereof, and outputs the selected data as pixel data.

Figure 2:
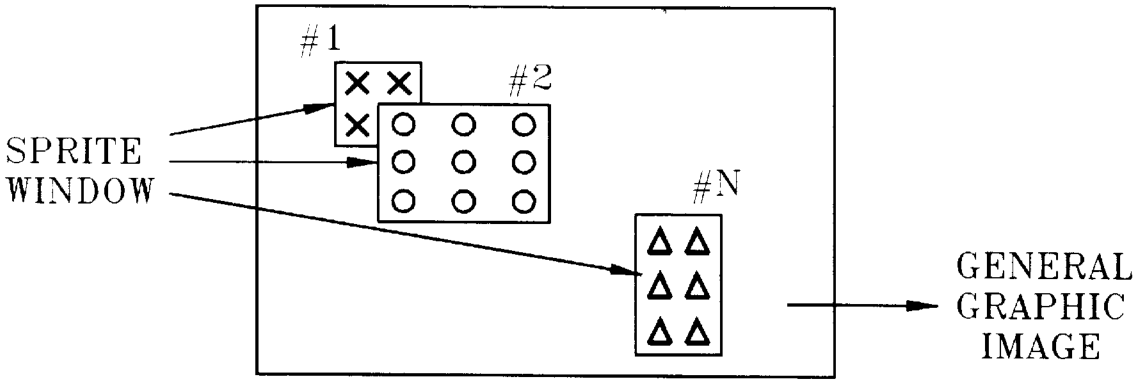
FIG. 2 illustrates an example where n sprite windows are displayed on a screen.

FIG. 2 illustrates an example where n sprite windows are displayed on a screen. The operation of the FIG. 1 apparatus will be described in more detail through an example embodying the FIG. 2 screen configuration.

Figure 3:
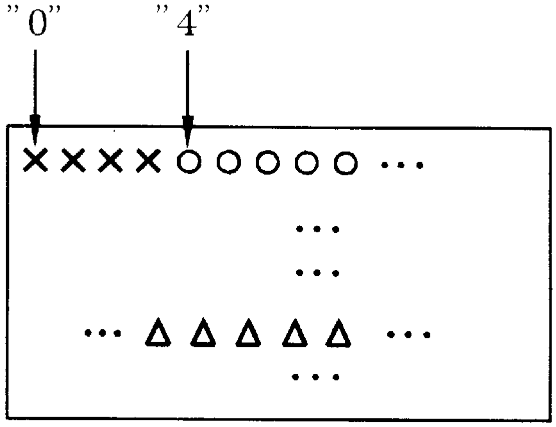
FIG. 3 illustrates stored data and addresses of a sprite memory with respect to the FIG. 2 image.

In FIG. 1, the first buffer 14 receives general graphic data transmitted in units of frames via a data bus, and the second buffer 28 receives sprite graphic data. The memory controller 10 generates the control signal and scan address for enabling the frame memory 12 to be in a write enable state when a signal demanding alteration of the frame data is input from the MPU (not shown), and supplies the generated control signal and scan address to the frame memory 12. The frame memory 12 writes the data input via the first buffer 14 according to the control signal and scan address supplied from the memory controller 10. The second multiplexer 24 supplies the input MPU address to the sprite memory 26 when the write address (MPU ADDR) is input from the MPU. In this case, the sprite memory 26 writes therein sprite graphic data with respect to one frame output from the second buffer 28. With respect to the FIG. 2 screen image, the sprite graphic data stored in the sprite memory 26 is shown in FIG. 3.

Meanwhile, if a screen refresh signal is input from the CRT controller (not shown), the memory controller 10 generates a control signal and a scan address for scanning the data stored in the frame memory 12. The frame memory 12 outputs the data designated by the scan address supplied from the memory controller 10 to the first buffer 14. The general graphic data output via the first buffer 14 is input to the input end (1) of the multiplexer 34 in the data selector 30.

Figure 4A:
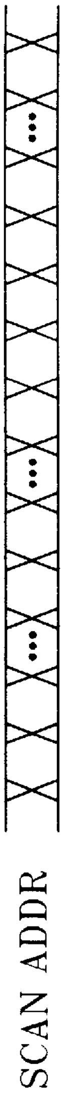
FIGS. 4A through 4E are timing diagrams of the respective elements of FIG. 1 with respect to the FIG. 2 image.
Figure 4B:

Meanwhile, so as to read the data stored in the frame memory 12, the scan address generated from the memory controller 10 is also input to the window pulse generator 16. The window pulse generator 16 compares the input scan address with the external address of the window range, and generates a window pulse when each pixel of the image corresponding to the input scan address is within a sprite window range. The window pulses with respect to the first, second and n-th sprite windows of FIG. 2 are shown in FIGS. 4B through 4D.

The window pulses are input to the address generator 18 and the priority encoder 20. The address generator 18 generates a read address of the sprite memory 26 corresponding to each window pulse as many as the number of the input window pulses. The address generator 18 generates a start address "0" of the first sprite window, as shown in FIG. 3, when the first window pulse is input. The address generator 18 increases the address according to a pixel clock during the time when a window pulse is a high level. The address generated in the address generator 18 is supplied to the sprite memory 26 via the first and second multiplexers 22 and 24. The sprite memory 26 reads data "x" designated by the input address and outputs the read data to the second buffer 28.

Figure 4C:
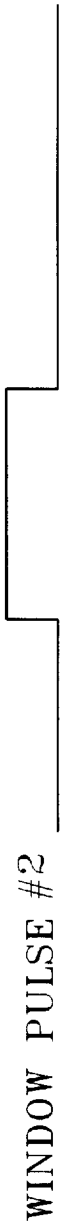
Figure 4D:
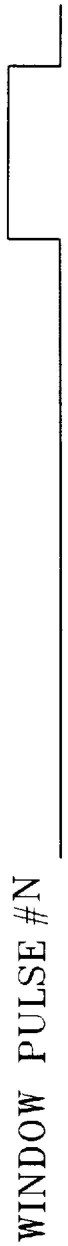
Figure 4E:

The window pulse generator 16 generates a window pulse at a pixel position corresponding to the second window range as shown in FIG. 4C. When the first window pulse is still a high level when the second window pulse is generated, the corresponding pixel is simultaneously included in a first sprite window and a second sprite window. In the case that different sprite graphic data stored in the sprite memory 26 are designated with addresses with regard to each window generated from the address generator 18, a conflict may result. In order to prevent the conflict between the data, the addresses with respect to the first and second sprite windows, generated from the address generator 18, are all input to the priority encoder 20. At this time, the priority encoder 20 generates priority information representing that the second sprite window has priority and supplies the generated priority information to the select end (sel) of the first multiplexer 22. The first multiplexer 22 selects a start address "4" of the second sprite window among the input addresses and outputs the selected address. In this case, the sprite memory 26 outputs the data "○" according to the input address.

The NOR gate 32 in the data selector 30 performs a NOR operation of the binary bit values of the output data of the sprite memory 26 which is input via the second buffer 28. The NOR gate 32 outputs the binary value "0" when at least one among the input values is "1", that is, the sprite graphic data exists. When the output value of the NOR gate 32 is "0", the corresponding pixel represents a position where the sprite graphic data is displayed. Thus, when the binary value "0" is input to the select end (sel) of the multiplexer 34, the multiplexer 34 selects the sprite graphic data input via the input end (0) and outputs the selected sprite graphic data as corresponding pixel data. On the contrary, since sprite graphic data does not exist when pixels of the image do not belong to a window range, the NOR gate 32 generates a binary value "1". The multiplexer 34 selects and outputs the general graphic data input via the input end (1) when the output value "1" of the NOR gate 32 is supplied to the select end (sel) thereof.

In general, there are portions where the sprite graphic data does not exist in the sprite window. When the sprite graphic data does not exist for a pixel belonging to the window range, the multiplexer 34 in the data selector 30 selects and outputs the general graphic data input to the input end (1) thereof. As described above, the data selector 30 processes the portions where the sprite graphic data does not exist in the window, to be transparent.

For the n-th sprite window, which does not overlap the other windows, the data "Δ" stored in the sprite memory 26 is output during the time when the window pulse is generated irrespective of the priority.

As described above, the present invention provides an apparatus for providing a multi-layer sprite graphic function and for performing an animation function effectively using such a multi-layer sprite graphic apparatus.

While only certain embodiments of the invention have been specifically described herein, it will be apparent to those skilled in the art that numerous modifications may be made thereto without departing from the spirit and scope of the invention.

What is claimed is:

1. An apparatus for performing a multi-layer sprite graphic function in video equipment having an on-screen-graphic function, comprising:

a controller for generating scan address data;

a frame memory for outputting video data stored therein according to said scan address data generated by said controller;

a window pulse generator for receiving said scan address data and for generating a window pulse for scan address data which is included in a window area determined by external data;

an address generator for generating read address data according to said window pulse supplied from said window pulse generator;

a sprite memory for storing sprite graphic data and for outputting said sprite graphic data according to said read address data supplied from said address generator; and a data selector for selectively outputting one of said video data output from said frame memory and said sprite graphic data output from said sprite memory.

2. The apparatus according to claim 1, wherein said sprite memory stores sprite graphic data of a plurality of sprite graphics, and outputs said sprite graphic data according to said read address data.

3. The apparatus according to claim 2, further comprising:

a priority encoder for assigning priority information to each of said plurality of read addresses output from said address generator; and a multiplexer for supplying one of said read address data output from said address generator to said sprite memory according to said priority information.

4. The apparatus according to claim 1, wherein said data selector selects said sprite graphic data supplied from said sprite memory during a time when said sprite memory is in a read mode and selects said video data output from said frame memory when said sprite memory is not in said read mode.

5. The apparatus according to claim 4, wherein said data selector comprises:

a NOR gate for performing a NOR operation of binary bits constituting said sprite graphic data output from said sprite memory and for outputting a result; and a multiplexer for selecting one of said sprite graphic data of said sprite memory and said video data of said frame memory.

6. A method for performing a multi-layer sprite graphic function in video equipment having an on-screen-graphic function, comprising the steps of:

generating scan address data;

outputting video data from a frame memory according to said scan address data;

generating a window pulse for scan address data which is included in a window area determined by external data;

generating read address data according to said window pulse;

outputting sprite graphic data from a sprite memory according to said read address data; and selectively outputting one of said video data output from said frame memory and said sprite graphic data output from said sprite memory.

7. The method according to claim 6, further comprising the steps of:

storing sprite graphic data of a plurality of sprite graphics; and outputting said sprite graphic data according to said read address data.

8. The method according to claim 7, further comprising the steps of:

assigning priority information to each of said plurality of read addresses; and supplying one of said read address data output from said address generator to said sprite memory according to said priority information.

9. The method according to claim 6, wherein said selective output step comprises the steps of:

selectively outputting said sprite graphic data supplied from said sprite memory during a time when said sprite memory is in a read mode; and selectively outputting said video data output from said frame memory when said sprite memory is not in said read mode.

10. The apparatus according to claim 9, wherein said selective outputting step further comprises the steps of:

performing a NOR operation of binary bits constituting said sprite graphic data output from said sprite memory and for outputting a result; and selecting one of said sprite graphic data of said sprite memory and said video data of said frame memory.

* * * * *